United States Patent [19]

Waugh

[11] 4,002,082
[45] Jan. 11, 1977

[54] ENDLESS POWER TRANSMISSION BELT
[75] Inventor: Dale L. Waugh, Springfield, Mo.
[73] Assignee: Dayco Corporation, Dayton, Ohio
[22] Filed: Sept. 17, 1975
[21] Appl. No.: 614,293
[52] U.S. Cl. .............................. 74/231 C; 74/233; 74/234
[51] Int. Cl.² ...................... F16G 1/28; F16G 5/16; F16G 5/00
[58] Field of Search ......... 74/231 C, 233 X, 234 X, 74/231 R

[56] References Cited
UNITED STATES PATENTS

| 1,656,628 | 1/1928 | Gits | 74/234 |
| 2,770,977 | 11/1956 | Beckadolph et al. | 74/231 C |
| 2,802,511 | 8/1957 | Waugh | 74/231 R X |
| 2,941,413 | 6/1960 | Huber et al. | 74/233 |

Primary Examiner—Leonard H. Gerin
Attorney, Agent, or Firm—Reuben Wolk

[57] ABSTRACT

An endless power transmission belt made primarily of elastomeric material is provided and has a compression section comprising a plurality of teeth defining the inside portion of the belt and each of the teeth has at least one groove extending therethrough substantially transverse thereto.

18 Claims, 5 Drawing Figures

U.S. Patent  Jan. 11, 1977  4,002,082
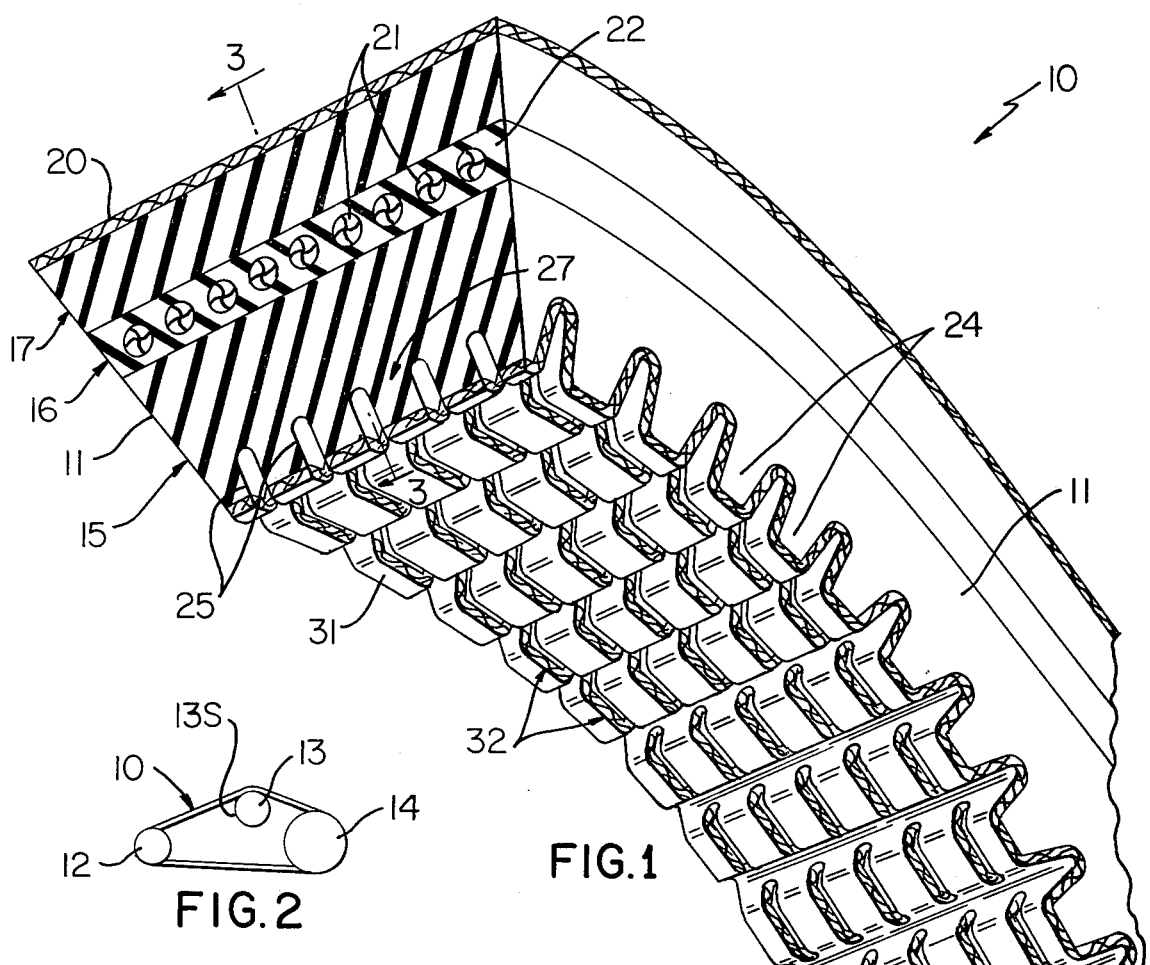

ENDLESS POWER TRANSMISSION BELT

BACKGROUND OF THE INVENTION

Toothed elastomeric endless power transmission belts made primarily of elastomeric material are used throughout industry; however, in certain applications such belts are somewhat noisy.

This is particularly true in belt drives in which toothed belts engage the cylindrical surface of a pulley. Often the drive system may generate high noise levels, and at the same time may fail to provide optimum traction between the belt teeth and the cylindrical surface.

SUMMARY

It is a feature of this invention to provide a simple and economical toothed endless power transmission belt having optimum flexibility yet without impairing the load-carrying capacity of such belt.

Another feature of this invention is to provide a toothed belt having teeth which are particularly adapted to operatively engage a right circular cylindrical pulley surface in a substantially noiseless manner while providing optimum traction.

Another feature is to provide an endless power transmission belt made primarily of elastomeric material and having a compression section comprising a plurality of teeth defining the inside portion of the belt and each of the teeth having at least one groove extending therethrough substantially transverse thereto.

Accordingly, it is an object of this invention to provide an endless power transmission belt and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section, parts in elevation, and parts broken away particularly illustrating one exemplary embodiment of the endless power transmission toothed belt of this invention;

FIG. 2 is a schematic view particularly illustrating the belt of FIG. 1 being utilized with a plurality of sheaves including a sheave having a right circular cylindrical outside surface;

FIG. 3 is a fragmentary cross-sectional view taken essentially on the line 3—3 of FIG. 1;

FIG. 4 is a cross-sectional view illustrating another exemplary embodiment of the toothed belt of this invention having grooves in each tooth which are spaced different distances along the associated tooth; and FIG. 5 is a fragmentary view in elevation illustrating another exemplary embodiment of the toothed belt of this invention which has a plurality of teeth which are spaced apart different distances along the endless path of the belt.

DESCRIPTION OF ILLUSTRATED EMBODIMENTS

Reference is now made to FIG. 1 of the drawing which illustrates one exemplary embodiment of a toothed endless power transmission belt of this invention which is designated generally by the reference numeral 10. The belt 10 has a substantially trapezoidal cross-sectional configuration including a pair of opposed non-parallel sides 11 free of covering materials and such belt is made primarily of elastomeric material which in this example is shown by cross-hatching as being rubber.

As illustrated in FIG. 2, for example, the toothed belt 10 is operatively connected in a system between a driving sheave or pulley 12 which drives or rotates a pair of driven sheaves or pulleys 13 and 14 with the pulleys 12 and 14 being of a usual known configuration having side flanges particularly adapted to receive the non-parallel sides 11 of the blet 10 thereagainst. The pulley 13 of this example has a right circular cylindrical outside surface 13S; and, the belt 10 is constructed such that the pulley 13 is driven by such belt in a substantially noiseless manner.

Belt 10 has channels for escapement of any liquid trapped between the belt 10 and the pulley 13 and as will be readily apparent from the detailed description which follows. In addition, the compression section of the toothed belt is such that there is optimum traction between the belt 10 and pulley 13 enabling driving of the pulley 13 substantially without slippage. It will be appreciated, that the pulley 12 is operatively connected to a suitable drive therefor and the pulleys 13 and 14 are also suitably connected to driven shafts or components to be rotated by such pulleys and all using devices and techniques which are well known in the art.

Referring now to FIG. 1 it will be seen that the belt 10 has a compression section 15, a load-carrying section 16 adjoining the compression section 15, and a tension section 17 adjoining the load-carrying section 16 and being arranged outwardly thereof. The tension section 17 is made of any suitable elastomeric material and has a cover 20 adjoining the outer surface thereof and in this example the cover 20 is shown as a fabric cover which also defines the outside surface of the belt 10.

The load-carrying section 16 is comprised of a helically wound load-carrying cord 21 which is suitably embedded in a gum-like elastomeric matrix 22; and the load-carrying cord may be made utilizing any suitable material known in the art.

The compression section 15 is comprised of a plurality of teeth a representative few of which have been designated by the same reference numeral 24 and the teeth 24 define the inside portion of the belt 10. Each of the teeth 24 has a plurality of grooves each designated by the same reference numeral 25 extending therethrough substantially transverse thereto to define a plurality of grooved teeth which will also be referred to and designated as grooved teeth 24. The teeth 24 are particularly adapted to contact the right circular cylindrical outside surface 13S of the pulley 13 to enable driving such pulley with optimum traction and in a substantially noiseless manner while providing channels for escapement of any liquids, such as oil, or the like, trapped between the belt 10 and the pulley 13; and, such traction, minimum noise, and the provision of liquid escapement channels are made possible by the cooperating action of the teeth 24 and the integral grooves 25 provided in such teeth.

In this example, the teeth 24 extend substantially perpendicular to the endless path of the belt 10 while the grooves 25 extend substantially parallel to such path. Further, it will be seen from FIGS. 1 and 3 that the teeth 24 are of equal size and are disposed along the belt 10 in substantially equally spaced relation.

Preferably, the teeth 24 are of equal height as indicated at 26 in FIG. 3 and the grooves 25 in each tooth 24 are spaced equally from each other as indicated at 27 in FIG. 1. Each of the grooves 25 in a particular tooth 24 also has a depth 30 which is less than the height 26 of the teeth and preferably the grooves 25 in a particular tooth 24 are of equal depth. The depth 30 is approximately 25 percent less than the height 26 of each tooth 24.

The compression section 15 also comprises a fabric cover layer or cover 31 covering the teeth 24 and defining the inside surface of the belt 10. The cover 31 may be made of any suitable material and may be made of a woven fabric, a non-woven fabric, or a knitted fabric.

The grooves 25 may be defined in each tooth 24 by extending through the fabric layer 31 and as illustrated at a pair of typical locations 32 in FIG. 1, for example. The grooves 25 may be made by any suitable process known in the art including integral forming during the build up of a belt sleeve from which a plurality of belts 10 are cut or the grooves 25 may be suitably cut in a belt 10 after such belt is completed.

Other exemplary embodiments of the belt of this invention are illustrated in FIGS. 4 and 5 of the drawing. The belts illustrated in FIGS. 4 and 5 are similar to the belt 10; therefore, such belts are designated by the reference numerals 10A and 10B respectively and representative parts of each belt similar to corresponding parts of the belt 10 will be designated in the drawing by the same reference numeral as the belt 10 (whether or not such representative parts are mentioned in the specification) followed by an associated letter designation, either A or B, and will not be described in detail.

The main difference between the belt 10A of FIG. 4 and the belt 10 is that the grooves 25A in each tooth 24A are spaced different distances from each other as indicated at 34A.

The main difference between the belt 10B of FIG. 5 and the belt 10 is that the equal size teeth 24B of the belt 10B are spaced apart different distances along the endless path of the belt as illustrated at 35B.

The belt of this invention and its various components may be of any elastomeric material known in the art including rubber, synthetic plastic materials, and/or combinations thereof. Preferably such belt is made primarily of rubber as shown by cross hatching for the belts 10 and 10A, for example.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt made primarily of elastomeric material and having a compression section comprising a plurality of teeth defining the inside portion of said belt and extending perpendicular to the endless path of said belt, each of said teeth having at least one groove extending therethrough substantially transverse thereto and extending parallel to said endless path.

2. A belt as set forth in claim 1 and further comprising at least another groove in each of said teeth also extending transverse thereto, said one groove and said other groove comprising a plurality of grooves in each of said teeth.

3. A belt as set forth in claim 2 in which each of said grooves extends into said compression section approximately the same distance.

4. A belt as set forth in claim 2 in which each of said teeth has a particular height and each of said grooves has a depth which is roughly 25% less than the height of said teeth.

5. A belt as set forth in claim 2 and further comprising a fabric layer covering said teeth and defining the inside surface of said belt.

6. A belt as set forth in claim 5 in which said teeth are arranged in equally spaced relation along the endless path of said belt.

7. A belt as set forth in claim 5 in which said teeth are of substantially equal size and are spaced different distances along said endless path of said belt.

8. A belt as set forth in claim 2 made of elastomeric material in the form of rubber and further comprising a load-carrying section adjoining said compression section and a tension section adjoining said load-carrying section and being arranged outwardly thereof.

9. A belt as set forth in claim 8 having a substantially trapezoidal cross-sectional configuration, non-parallel sides free of covering materials, and a load-carrying section comprised of a helically wound load-carrying cord.

10. An endless power transmission belt made primarily of elastomeric material and having a compression section comprising a plurality of teeth defining the inside portion of said belt and extending perpendicular to the endless path of said belt, each of said teeth having a plurality of grooves extending therethrough substantially transverse thereto extending parallel to said endless path to define a plurality of grooved teeth, said grooved teeth being particularly adapted to contact and drive a pulley having a right circular cylindrical ouside surface to enable driving said pulley in a substantially noiseless manner as well as providing channels for escapement of any liquids trapped between said belt and said pulley.

11. A belt as set forth in claim 10 in which said teeth are of equal size and are disposed along said belt in substantially equally spaced relation.

12. A belt as set forth in claim 10 in which said teeth are of equal size and are spaced apart different distances along said belt.

13. A belt as set forth in claim 10 in which each of said teeth has a particular height and each of said grooves has a depth which is less than the height of said teeth.

14. A belt as set forth in claim 10 in which the grooves in each tooth are spaced equally from each other.

15. A belt as set forth in claim 10 in which the grooves in each tooth are spaced different distances from each other.

16. A belt as set forth in claim 10 wherein said teeth are of the same height and each of said grooves has a depth which is roughly 25 percent less than the height of said teeth and further comprising a fabric layer covering said teeth and defining the inside surface of said belt.

17. A belt as set forth in claim 16 made of elastomeric material in the form of rubber and further comprising a load-carrying section adjoining said compression section and a tension section adjoining said load-carrying section and being arranged outwardly thereof.

18. A belt as set forth in claim 17 and having a substantially trapezoidal configuration including nonparallel sides free of covering materials and further comprising a cover adjoining the outside surface of said tension section and defining the outside surface of said belt.

* * * * *